United States Patent
Samartsev et al.

(10) Patent No.: US 8,829,388 B2
(45) Date of Patent: Sep. 9, 2014

(54) METHOD FOR CONTACTLESS LASER WELDING AND APPARATUS

(75) Inventors: Igor Samartsev, Fryazino (RU); Vladimir Antonenko, Fryazino (RU); Leonid Pudov, Fryazino (RU)

(73) Assignee: IPG Photonics Corporation, Oxford, MA (US)

(*) Notice: Subject to any disclaimer, the term of this patent is extended or adjusted under 35 U.S.C. 154(b) by 66 days.

(21) Appl. No.: 13/193,723

(22) Filed: Jul. 29, 2011

(65) Prior Publication Data

US 2013/0026143 A1 Jan. 31, 2013

(51) Int. Cl.
- B23K 26/00 (2014.01)
- B23K 26/08 (2014.01)
- B23K 26/24 (2014.01)
- B23K 26/14 (2014.01)
- B23K 26/02 (2014.01)

(52) U.S. Cl.
CPC .......... B23K 26/023 (2013.01); B23K 26/246 (2013.01); B23K 26/1458 (2013.01)
USPC ............ 219/121.64; 219/121.63; 219/121.78; 219/121.84

(58) Field of Classification Search
USPC .............. 219/121.63, 121.64, 121.78, 121.84
See application file for complete search history.

(56) References Cited

U.S. PATENT DOCUMENTS

| | | | |
|---|---|---|---|
| 3,530,566 A * | 9/1970 | Abercrombie et al. ......... 29/447 |
| 4,027,137 A * | 5/1977 | Liedtke ..................... 219/121.7 |
| 4,698,480 A * | 10/1987 | Klingel .................... 219/121.67 |
| 4,760,236 A * | 7/1988 | Stoll ......................... 219/121.63 |
| 4,924,756 A * | 5/1990 | Berube et al. ..................... 92/45 |
| 4,942,284 A * | 7/1990 | Etcheparre et al. ...... 219/121.67 |
| 5,298,716 A * | 3/1994 | Ogawa et al. ............ 219/121.67 |
| 5,410,123 A * | 4/1995 | Rancourt ................. 219/121.63 |
| 5,942,138 A * | 8/1999 | Toda et al. .............. 219/121.72 |
| 5,948,292 A * | 9/1999 | Tanaka et al. ............ 219/121.82 |
| 6,262,387 B1 * | 7/2001 | Chang ..................... 219/121.63 |
| 7,326,878 B2 * | 2/2008 | Odanaka et al. ......... 219/121.84 |
| 7,816,621 B2 * | 10/2010 | Weick et al. ............... 219/121.6 |
| 7,910,856 B2 * | 3/2011 | Koseki et al. ............ 219/121.67 |
| 8,212,176 B2 * | 7/2012 | Akiyama et al. ......... 219/121.67 |
| 2002/0053556 A1 * | 5/2002 | Nakata et al. ............. 219/121.7 |
| 2004/0226927 A1 * | 11/2004 | Morikazu et al. ........ 219/121.84 |
| 2005/0023257 A1 * | 2/2005 | Pyritz et al. ............. 219/121.64 |
| 2007/0151958 A1 * | 7/2007 | Modra ..................... 219/121.67 |
| 2007/0221637 A1 * | 9/2007 | Schurmann et al. ..... 219/121.63 |
| 2007/0228021 A1 * | 10/2007 | Wagou et al. ............ 219/121.63 |
| 2008/0079204 A1 * | 4/2008 | Pletner et al. .............. 267/64.17 |

* cited by examiner

*Primary Examiner* — Dana Ross
*Assistant Examiner* — Gyounghyun Bae
(74) *Attorney, Agent, or Firm* — Yuri Kateshov, Esq.; Timothy J. King, Esq.

(57) ABSTRACT

A method for contactless laser welding of a plurality of sheets of material stacked upon one another includes simultaneously delivering a laser beam and a stream of fluid through a laser head and further through an end cap which is removably mounted to the laser head. The end cap is configured with a stationary cylinder, which is coupled to the laser head, and a piston movable relative the cylinder. The piston moves in response to a pressure differential generated by the fluid in chambers above and below the piston. Once the pressure equilibrium is reached between the chambers, the pressure in the chamber below the piston is sufficient to reliably press the sheets of material against one another during a laser welding operation.

11 Claims, 3 Drawing Sheets

METHOD FOR CONTACTLESS LASER WELDING AND APPARATUS

BACKGROUND OF THE DISCLOSURE

1. Field of the Disclosure

The disclosure relates to welding sheets of material and more particularly the disclosure relates to welding sheets of material by means of fiber lasers.

2. Prior Art

The laser welding technique requires a close contact between workpieces to be welded together. Furthermore, the contact should be maintained so that a thermo-load, which is a by-product of welding process, was uniformly distributed in the welding region. Otherwise, the pieces to be welded would be deformed. A few approaches concerned with the contact and thermal aspects in a laser welding process are known and discussed herein below.

The EP1219384 discloses a laser-welding head for coupling workpieces to one another. The head includes a pressing device, having a roller which moves along parts of respective workpieces near a weld line to press together the workpieces, and a pressing unit for applying a predetermined pressure to the parts near the weld line. The welding is realized by displacing the roller only along linear paths. Often, the roller leaves a scratch on the surface to be treated. Also, the velocity of the roller is not high.

The US patent publication US2005279448 also discloses a pressing unit configured to press the workpieces to be welded towards one another. The pressing unit is made from transparent material to allow a laser beam to propagate through the unit. The pressing unit is fixed to the workpieces and should be constantly readjusted.

There is a need therefore to provide a contactless laser-based method for welding workpieces that are held together without the use of the pressing units.

A further need exists for a contactless laser-based welding process providing a laser head with displacement along a variety of paths at a relatively high velocity.

SUMMARY OF THE DISCLOSURE

These needs are satisfied by a method and apparatus of the present disclosure configured to laser weld two or more sheets of material which are pressed against one another by a pressure generated by fluid. The disclosed apparatus does not incorporate any mechanical means for pressing the sheets to be welded towards one another.

In accordance with one aspect of the disclosure, a fluid, such as gas, is supplied through a laser head towards the surface of the top sheet of material. The end piece of the laser head is configured with a stationary part which is removably mounted to the laser head. The end piece further has a movable part coupled to the stationary part so as to move between the top sheet of material and laser head in response to pressure differential at top and bottom sides of the movable part. Eventually the movable part is displaced to a balanced position in which fluid pressure in a gap between the bottom of the moving part and the top sheet of material is sufficient to bring the sheets in contact with one another. As a result, the sheets of material are in brought in contact with one another exclusively by fluid pressure.

In accordance with one feature, the geometry of the gap between the end piece of the laser head and surface of the top sheet of material is automatically controlled to provide a gas pressure within the gap sufficient to provide continuous contact between workpieces. Accordingly, the movable part is automatically occupies a balanced position relative to the surface of the top sheet in which the sufficient fluid pressure is maintained in the gap during welding.

In accordance with a further aspect of the disclosure, the apparatus carrying out the disclosed process is configured with a laser head centered along a longitudinal axis and an end piece removably mounted on the head. The body of the piece defines an outlet traversed by the gas stream which flows through the laser head and further via the outlet of the end piece into the gap.

The end piece includes a stationary part rigidly coupled to the laser head and a movable part movable within the stationary part towards and away from the surface of the top workpiece. The parts of the end piece define a piston and cylinder unit which has the area of the piston configured so as to create the sufficient pressure in the gap. The sufficient pressure simultaneously provides contact between workpieces and keeps the movable part at the desired distance from the opposing workpiece in the balanced position.

BRIEF DESCRIPTION OF THE DRAWINGS

The above and other aspects and features of the disclosed method and apparatus will become more readily apparent from the specific description accompanied by the following drawings, in which.

SPECIFIC DESCRIPTION

Figures 1, 1A:
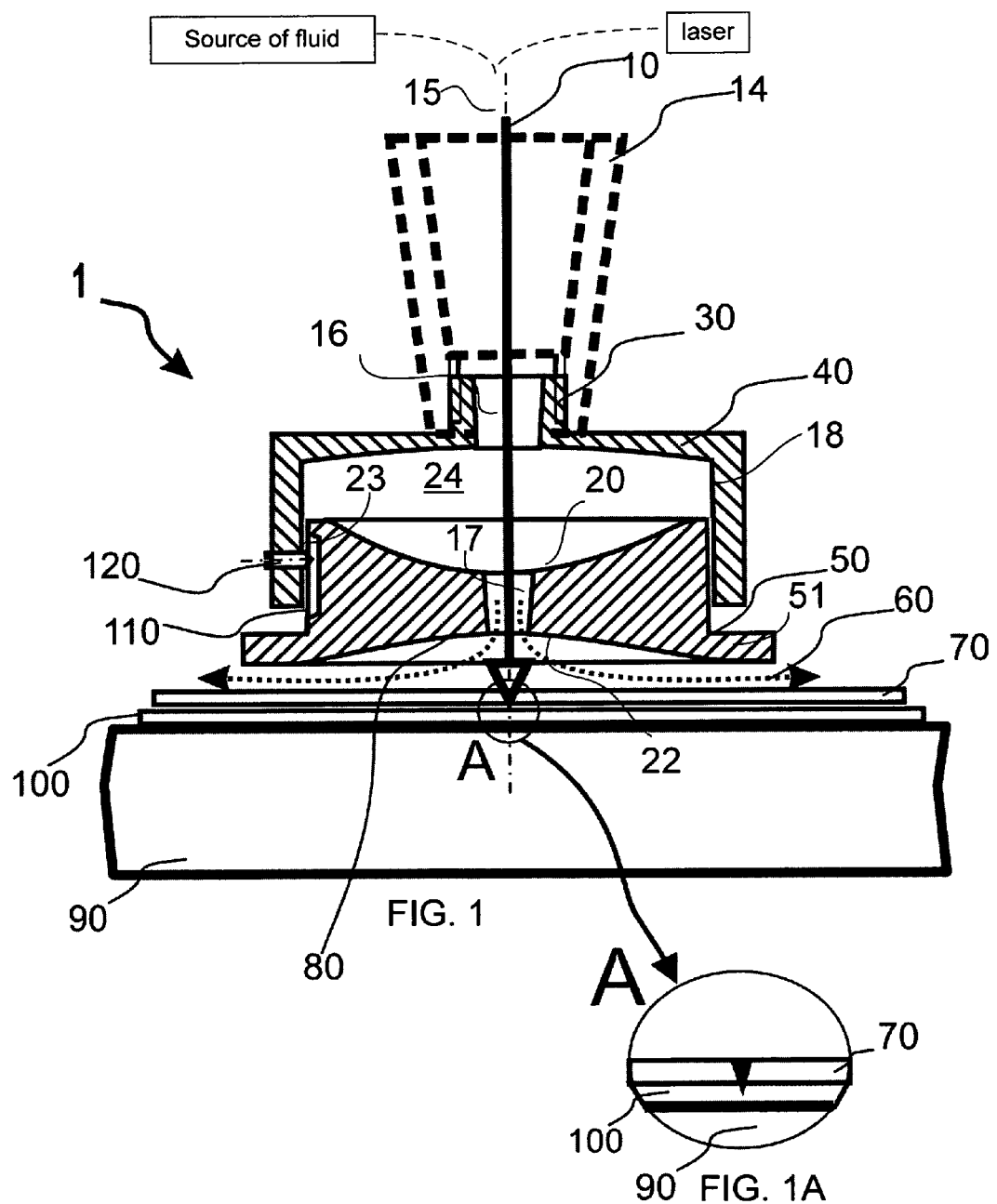
FIG. 1 illustrates a cross-sectional view of one of the embodiments of the disclosed laser head provided with an end piece.
FIG. 1A is an enlarged view of detail A seen in FIG. 1.

Reference will now be made in detail to embodiments of the invention. Wherever possible, same or similar reference numerals are used in the drawings and the description to refer to the same or like parts or steps. The drawings are in simplified form and are not to precise scale. For purposes of convenience and clarity only, directional (up/down, etc.) or motional (top/bottom, forward/back, etc.) terms may be used with respect to the drawings. These and similar directional terms should not be construed to limit the scope of the invention in any manner.

FIG. 1 illustrates an apparatus 1 configured to weld two or more workpieces 70 and 100, such as sheet metals, lying one atop the other on a coordinate support 90 and typically having a gap therebetween as better seen in FIG. 1A. Gaps between the sheets of material to be welded prevent the sheets from being reliably welded and thus should be eliminated.

The apparatus 1 further includes a laser source including, for example, high power fiber laser generating a laser beam 10 which is delivered to a laser head 14, and a source of pressurized fluid 15. Both laser beam 10 and fluid flow 15 are guided through the laser head. The laser head 14 is centered on a longitudinal axis and configured to focus and train laser beam 10 through an end piece coupled to the laser head.

The end piece includes a cylinder 40, which is removably mounted to laser head 20 by a fastener unit 30, and a piston 50 displaceable axially relative to the cylinder. The fastener unit 30 may have numerous configurations well known to one of ordinary skills in the mechanical art. For example, cylinder 40 and head 14 may have respective threaded surfaces engaging one another, or the diameters of respective head and cylinder may be configured so that these parts are press-fit with one another to establish a reliable connection therebetween.

The fluid 15, including pressurized air or any other suitable gas and gaseous mixtures, traverses laser head 14 and is delivered onto the surface of workpiece 70 through passages 16, 17 provided in respective cylinder 40 and piston 50. In operation, the pressurized fluid first impinges upon a top surface 20 of piston 50 so that the latter is displaceable towards the top surface of workpiece 70 into a gap 60, as shown by oppositely facing arrows and explained in detail hereinbelow. Then, the flow of pressurized fluid 15 traverses gap 60 generating a positive pressure sufficient to urge top sheet of material or workpiece 70 against subsequent workpiece 100. Accordingly, the pressure of pressurized fluid has to be such that workpieces 70 and 100, respectively, have a reliable surface contact with one another in a welding region, while piston 50 is prevented from completely closing gap 60.

The piston 50 and cylinder 40 of the piston and cylinder unit have respective axial passages 16 and 17 centered along the longitudinal axis and traversed by both the laser beam and pressurized fluid. In use, the bottom surface of piston 50 is configured so that piston 50 advances into gap 60 and stops in a balanced position. In this position piston 50 is practically idle and thus neither extends further into gap 60 nor withdraws back into cylinder 40 due to the continuously maintained desired air pressure in gap 60 which is substantially equal to the pressure in a chamber 24 delimited by the periphery of cylinder 40 and top surface 20 of piston 50. As a consequence, top workpiece 70 is reliably pressed against bottom workpiece 100 in the balanced position of piston 50 while the laser head is guided along a predetermined weld path at a distance from top workpiece 70.

The establish the balanced position, piston 50 is configured to have the desired ratio between areas of respective top 20 and bottom 22 surfaces of the piston. In particular, the area of bottom surface 22, which faces workpiece 70, should be larger than the area of top surface 20, which faces the laser head.

As the pressurized fluid builds up a pressure in chamber 24 above top surface 20 and flows through passage 16, piston 50 slidably moves toward workpiece 70 generating pressure in gap 60 which is sufficient to press top sheet of material/workpiece 70 against bottom workpiece 100. Once the pressure within gap 60 under bottom surface 22 becomes substantially equal to the pressure in chamber 24 above top surface 20, displacement of piston 50 stops and the balanced position thereof is established.

The piston 50 may have a variety of configurations and, as shown, has a substantially axially concave top surface 20 and convex bottom surface 22. The convexity of bottom surface 22 improves evacuation of debris during a welding process. The convex portion bottom surface 22 bridges a flange 51 which extends radially over at least a bottom portion 110 of cylinder's peripheral surface 18 and defines a mechanical stop in case if the pressure in gap 60 increases above the pressure above top surface 20. On the other hand, the body of piston 50 has an elongated U-shaped recess 23 receiving a stop, such as a screw 120. As either of the opposite sides of recess 23 comes into contact with screw 120, axial displacement of piston 50 is arrested.

Figure 2:
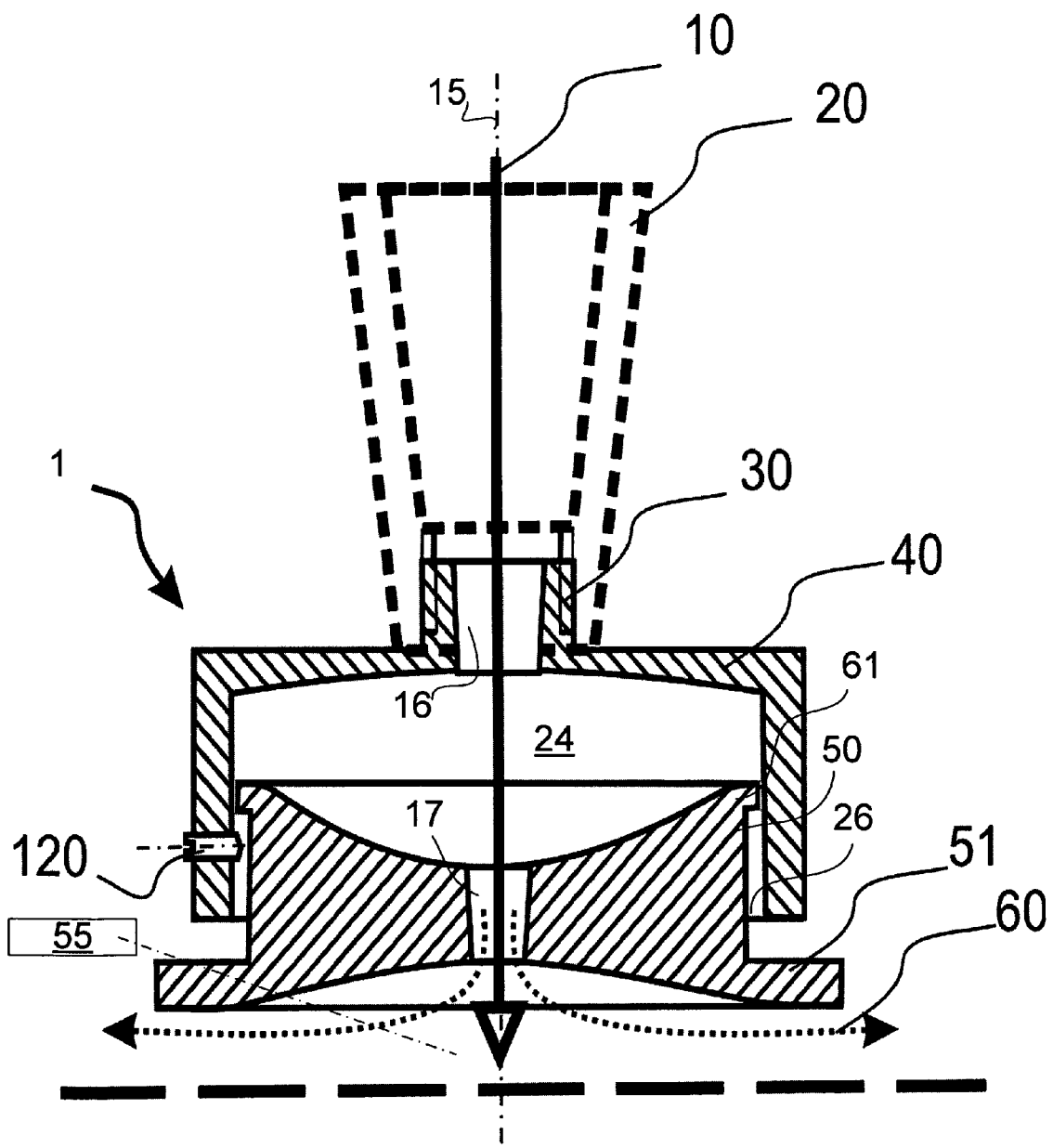
FIG. 2 illustrates a cross-sectional view of another embodiment of the disclosed laser head provided with the end piece.

FIG. 2 illustrates a slightly modified structure of apparatus 1. In particular, the peripheral surface of piston 50 is continuously axially recessed between bottom flange 51 and a top flange 61. This configuration allows a precession of piston 50 about the longitudinal axis of symmetry of the laser head. The cylinder's precession may be used in combination with tracing and displacing means 55 by first identifying obstacles along on the surface of the top workpiece along a path of laser head and then displacing the cylinder in any desirable plane so as to move around or over such formations.

Figure 3:
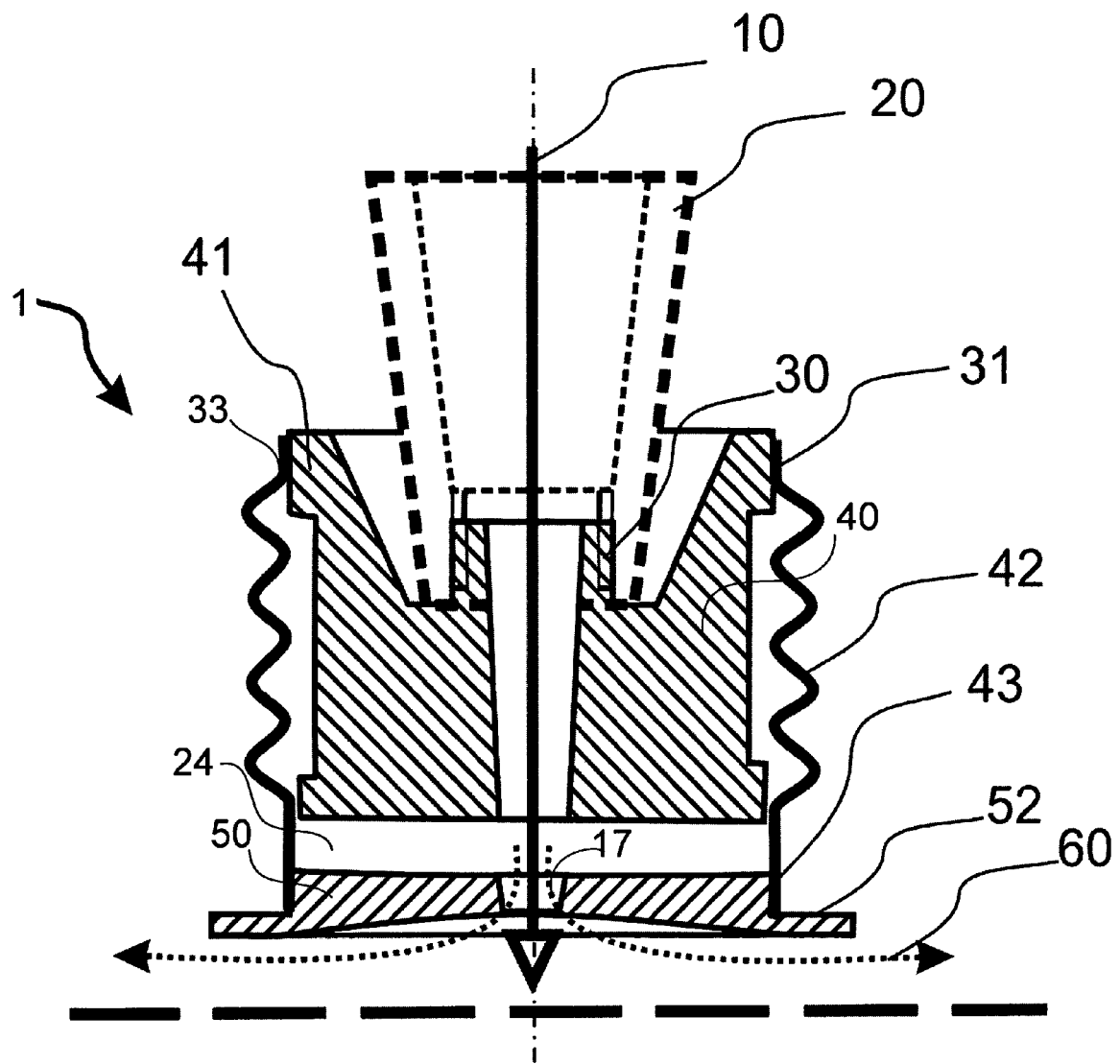
FIG. 3 illustrates still a further embodiment of the disclosed laser head with the end piece.

FIG. 3 illustrates a further modification of apparatus 1. In particular, the end cap in addition to a stationary part 40 and displaceable part 50, includes a resilient element 31 configured to place piston 50 at a predetermined distance from cylinder 40. When the pressure in chamber 34 exceeds the spring force element 31, piston 50 will slide towards the sheets of material with gradually increasing pressure in gap 60 until piston 50 reaches the balanced position. Once the fluid flow into chamber 24 interrupts, the piston is displaced to its predetermined position under the spring force.

The resilient element 31 has opposite top and bottom flanges 33 and 43, respectively, fixed to respective cylinder 40 and piston 50. Due to resilient element 31, the top surface of piston 50 can be spaced from the opposing surface of cylinder 40 which allows piston 50 a greater axial displacement, compared to the embodiments of respective FIGS. 1 and 2, and also precessional motion.

In summary, during welding two or more sheets of metal, which are stacked one upon another, the fluid, such as air, inert gases, and any conceivable gaseous mixture, is delivered to a gap above the top sheet. As the pressure builds up in this space, the sheets move towards one another until contact therebetween is established. The process starts with first displacing the laser head to a welding region by of mechanical, electrical or any other displacement means, and then the desired position of the cap is established automatically by pneumatically displacing piston 50 relative to cylinder 40. As piston 50 moves towards top sheet 70 under fluid pressure in upper chamber 24, the fluid flows into gap 60 under piston 50 through central passage 17 provided in the piston. Hence a pressure is built up in gap 60 between the top sheet and piston, which, in turn, forces the top sheet to move towards the next sheet and etc. When the pressure above and below the piston is substantially uniform, the displacement of the piston stops art a distance from the top sheet of material. This stoppage indicates that the sheets of material are in mechanical contact with one.

The end cap may be made from a variety of materials. In operation, the pressure generated in gap 60 between piston 50 can be controlled by bottom surface 22 of piston and vary anywhere between several hundreds gram and tens of kilograms. Depending on the local requirements, the desired pressure provides excellent results. For example, a 10 kilogram pressure provided excellent results during welding of sheets of stainless steel each of about 0.12 mm. The output of the laser used in the above example was of about 100 watts at a 1.06 micron wavelength and displacement speed of the laser head of about 15 m per minute.

While this disclosure has described various aspects of the present invention, the latter is not limited thereto, and is susceptible to numerous changes and modifications as known to those skilled in the art. Therefore, the invention is not limited to the details shown and described herein, and includes all such changes and modifications as are encompassed by the scope of the appended claims.

The invention claimed is:

1. An end cap for a laser-based welding apparatus operative to weld together a plurality of stacked sheets of material, comprising:
   a stationary part extending along an axis, and
   a movable part mounted to the stationary part and having a passage which extends along the axis between top and bottom surfaces of the movable part, the passage being traversed by co-propagating laser beam and stream of pressurized fluid which builds up a positive pressure acting upon a top surface of the movable part so as to axially displace the latter towards a top sheet of material while the stream, traversing the passage, gradually creates a negative pressure on the bottom surface, the movable part being stopped in a balanced position of the moving part in which the positive and negative pressures substantially uniform, wherein the sheets of material in the balanced position of the movable part are in continuous contact with one another while being welded together by the laser beam.

2. The end cap of claim 1, wherein the movable part is concave.

3. The end cap of claim 2, wherein the bottom surface of the movable part has an area greater than that one of the top surface.

4. The end cap of claim 1, wherein the moving and stationary parts define a piston and cylinder unit in which the piston has an outer periphery in sliding contact with an inner periphery of a cylinder.

5. The end cap of claim 4, wherein the outer periphery of the piston is recessed along a stretch which terminates at a distance from the bottom surface of the piston and limiting displacement of the piston.

6. The end cap of claim 4, wherein the outer periphery of the piston is recessed between the top and bottom surfaces of the piston so that the piston is provided with a precessional motion about an axis of symmetry of the end cap.

7. An apparatus for laser-welding sheets of material stacked on a support, comprising:

a laser head having an outlet configured to train a laser beam on a welding region;

a piston and cylinder unit having a cylinder, which is removably mounted to the outlet, and a piston having a passage extending between and opening into top and bottom surfaces of the piston the passage being traversed by co-propagating laser beam and stream of pressurized fluid which creates a positive pressure on the top surface and, while flowing through the channel, gradually builds up a negative pressure on the bottom surface of the piston, the piston being displaceable towards the welding region while the positive and negative pressures are not equal and stopped at a distance from the top sheet in a balanced position when the pressures substantially match one another, wherein the sheets of material are in continuous mechanical contact with one another in the welding region in the balanced position of the piston.

8. The apparatus of claim 7, wherein the cylinder is formed with a through passage aligned with the outlet of the laser head and the passage of the piston.

9. The apparatus of claim 8 further comprising a source of the pressurized fluid which flows through the aligned outlet of the laser head and the passage in respective cylinder before traversing the passage in the piston.

10. The apparatus of claim 7, wherein the piston is concave.

11. The apparatus of claim 10, wherein the bottom surface of the piston is configured so that the area thereof determines a force generated by the pressure in the second chamber and sufficient to press the sheets against one another, wherein the force is proportional to an area of the bottom surface.

\* \* \* \* \*